(12) United States Patent
Kesling et al.

(10) Patent No.: US 8,995,594 B2
(45) Date of Patent: Mar. 31, 2015

(54) BASEBAND CANCELLATION OF PLATFORM RADIO INTERFERENCE

(75) Inventors: Dawson W. Kesling, Davis, CA (US); Andrew W. Martwick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 13/591,381

(22) Filed: Aug. 22, 2012

(65) Prior Publication Data

US 2014/0056337 A1 Feb. 27, 2014

(51) Int. Cl.
H04B 1/10 (2006.01)
H04B 1/38 (2006.01)
H04L 27/06 (2006.01)

(52) U.S. Cl.
CPC . H04L 27/06 (2013.01); H04B 1/38 (2013.01)
USPC ........... 375/350; 375/220; 375/235; 375/284; 375/285; 375/349

(58) Field of Classification Search
CPC ................. H04L 27/2647; H04L 2025/03426; H04L 2025/03414; H04L 25/0204; H04L 25/03343
USPC ......... 375/297, 219–223, 229–236, 259–294, 375/316–352
See application file for complete search history.

(56) References Cited

U.S. PATENT DOCUMENTS

| | | | |
|---|---|---|---|
| 7,043,203 B2 * | 5/2006 | Miquel et al. | 455/24 |
| 2003/0115533 A1 | 6/2003 | Asada et al. | |
| 2004/0264560 A1 * | 12/2004 | Demir et al. | 375/222 |
| 2005/0008097 A1 | 1/2005 | Tjhung et al. | |
| 2008/0012575 A1 | 1/2008 | Ebert | |
| 2009/0016459 A1 | 1/2009 | Kim et al. | |
| 2009/0089851 A1 | 4/2009 | Guo et al. | |
| 2010/0027590 A1 | 2/2010 | Alebachew et al. | |
| 2011/0149920 A1 | 6/2011 | Liu et al. | |
| 2011/0231862 A1 * | 9/2011 | Walsh | 719/318 |
| 2012/0069940 A1 | 3/2012 | Guo et al. | |

FOREIGN PATENT DOCUMENTS

WO 2013/048537 A1 4/2013

OTHER PUBLICATIONS

Kesling et al., "Apparatus and Method for Coding Data Based on Phasor Disparity", PCT Application No. PCT/US2011/054498 filed on Oct. 1, 2011, 26 pages.
International Search Report and Written Opinion received for PCT Patent Application No. PCT/US2011/054498, mailed on Apr. 17, 2012, 4 pages.
International Search Report and Written Opinion received for PCT Patent Application No. PCT/US2013/047505, mailed on Sep. 2, 2013, 10 pages.

* cited by examiner

*Primary Examiner* — Sam K Ahn
*Assistant Examiner* — James M Perez
(74) *Attorney, Agent, or Firm* — Alpine Technology Law Group LLC

(57) ABSTRACT

Briefly, in accordance with one or more embodiments, a platform may comprise a receiver to receive a signal that includes an error in the received signal due to a noise signal generated in the platform, and a processor configured to calculate a noise vector from a source of the noise signal and to send the noise vector to the receiver. The receiver may include a digital signal processor configured to estimate an error vector based at least in part on the noise vector and to subtract the estimated error vector from the received signal to cancel the noise signal from the received signal. The noise cancelled from the received signal may include platform noise generated by a bus, a memory circuit, a clock, a power supply, a circuit ground or integrated circuit substrate, or input/output circuit of the platform.

21 Claims, 13 Drawing Sheets

BASEBAND CANCELLATION OF PLATFORM RADIO INTERFERENCE

BACKGROUND

Interference with platform wireless operation caused by noise coming from system buses and clocks internal to a device, referred to as platform noise, is a growing concern. The impact of such platform noise is becoming more severe in smaller, more radio-rich platforms and frequently forces higher costs, delayed product launches due to redesign and retest cycles, and post launch end user complaints.

Previous solutions include metallic shielding, Radio Interference Mitigation (RIM) technology, and Adaptive Clocking Technology (ACT), as some examples. Shielding is the predominant industry solution but is undesirable due to materials and tooling costs as well as impacts on form factor flexibility which for example impacts airflow, weight, and product thickness. The RIM approach adaptively cancels platform clock interference in the radio. ACT addresses clock noise at the source rather than at the radio wherein platform clock frequencies are shifted slightly to minimize harmonic overlap with wireless bands. When used in combination, ACT and RIM may provide helpful mitigation of clock noise but such approaches do not address noise from bus traffic. ACT is furthermore limited by tight clock specifications in some cases.

There is currently no effective electronic solution in production for mitigation of bus noise. One proposed approach involves binary encoding of bus data before transmission. However, the specific coding technique must be customized for each bus type, for example double data rate (DDR) memory buses, peripheral component interconnect express (PCIe) buses, universal serial bus (USB) buses, and so on, in order to minimize the inherent impact that such coding has on bus data throughput and power, as well as to reduce required changes to existing industry standards and third-party components.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIGS. 1A and 1B are example platforms capable of mitigating radio interference from one or more noise sources in accordance with one or more embodiments;

FIGS. 2A, 2B, and 2C are orthogonal frequency-division multiplexing (OFDM) graphs is in accordance with one or more embodiments;

Figure 1A:
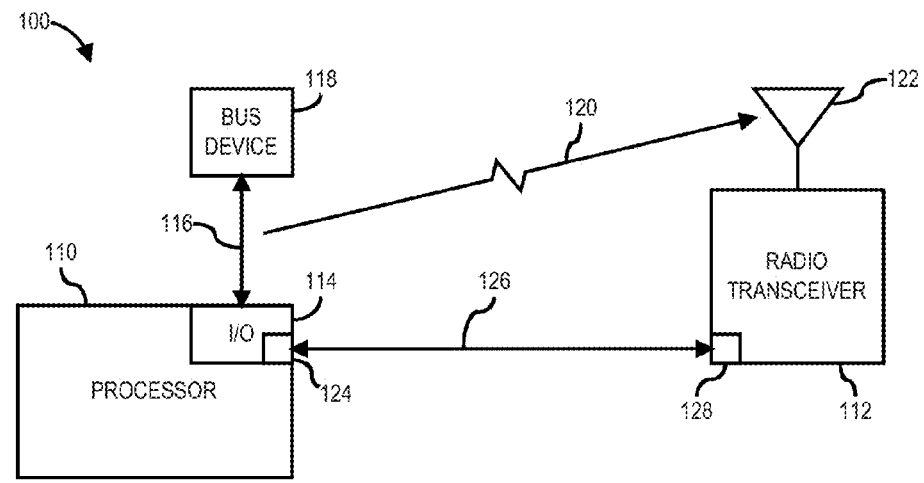

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Coupled also means that two devices have no physical connection but interact electrically through electromagnetic fields. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Figure 1B:
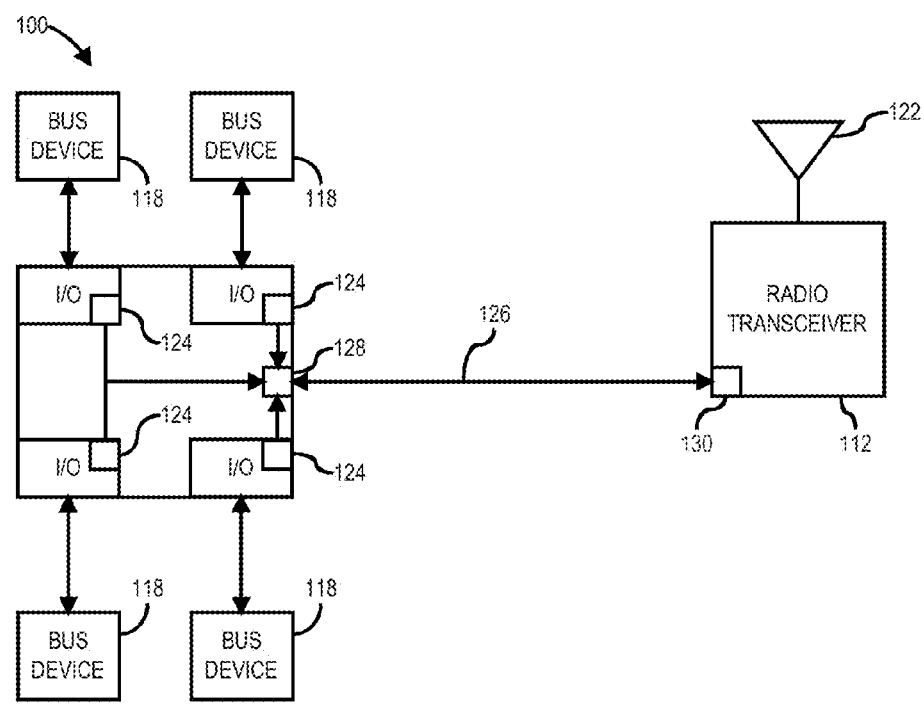

Referring now to FIGS. 1A and 1B, example platforms capable of mitigating radio interference from one or more noise sources in accordance with one or more embodiments will be discussed. As shown in FIG. 1A, a platform 100 may include a processor 110 coupled with a radio transceiver 112 wherein the processor 110 may include or couple to an input/output (I/O) controller 114 or other data circuit. The I/O controller 114 may implement a bus 116 to couple with one or more bus devices 118. The bus 116 may comprise one or more data and/or clock lines or traces and power planes to communicate with bus device 118 and to optionally deliver power to the bus device 118. Such signal, clock or power lines of bus 116 may radiate noise 120 that may be picked up at the antenna 122 of the radio transceiver 112 that may inadvertently be introduced into the radio-frequency (RF) signals transmitted from or received by the radio transceiver 112. The noise may also be coupled directly to the radio by the direct connection of the power delivery network. The signals radiated from the bus 118 may generate interference in the RF spectrum at or near the frequency of operation of the radio transceiver 112, either at the specific operational frequency or via generation of harmonics by the bus or clock signals that fall in the same RF spectrum as the RF signals utilized by the radio transceiver 112. In one or more embodiments, such noise 120 may be referred to generally as platform interference or platform noise since the interference is often generated within a single system wherein one subsystem may generate interference with one or more other subsystems in the device. In general, the platform noise may be generated by any data circuit of the platform and/or any trace or line that may carry such signal either intentionally or inadvertently including but not limited to a bus, a memory device, a clock, a power supply, or input/output circuit.

In accordance with one or more embodiments, the I/O controller 114 or similar bus or clock device may include a noise vector generator 124 that calculates the noise vectors representative of the noise 120 radiated by the bus 116 to the radio transceiver 112. The noise vectors calculated by the noise vector generator 124 may be transmitted to the radio transceiver 112 via a link which may comprise a low speed data link 126 in one or more embodiments. Such a low speed data link 126 may transmit data on the order of tens of megabytes or so, and may be implemented using existing interfaces such as a peripheral component interconnect express (PCIe) interface, a universal serial bus (USB) and/or USB high speed inter-chip (HSIC) interface, or the M-PHY specification set forth by the Mobile Industry Processor interface (MIPI) although the scope of the claimed subject matter is not limited in this respect.

The radio transceiver 112 may include a noise vector scaling and synchronization block 128 that receives noise vectors over link 126 for synchronization and scaling. In one or more embodiments, the noise vector scaling and synchronization block 128 may be realized by a digital signal processor of the radio transceiver 112, although the scope of the claimed subject matter is not limited in this respect. The synchronized and scaled noise vectors may be cancelled from received radio signals at radio transceiver 112 so that the received radio signals may effectively have the interference due to the noise eliminated from the radio signals. It should be noted that the term cancel as used herein may refer to cancelling all, nearly all, or at least a portion of the noise from a signal such that the data encoded in the signal may be decoded, determined, or recovered with a reduced error rate in comparison with the error rate that would otherwise occur without cancellation of the noise. In general, the term cancel may mean that noise is removed, reduced or mitigated, and may not necessarily mean that all of the noise is completely removed from a signal. In some embodiments, cancellation of noise may refer to the concept of noise cancellation as known to those of skill in the art. However, these are merely one of several possible meanings of the term cancel or cancellation, and the scope of the claimed subject matter is not limited in these respects.

FIG. 1B illustrates the cancellation of such radio interference due to platform noise 120 generated by multiple I/O devices 114 and/or multiple buses 116 wherein the I/O devices 114 contain a respective noise vector generator 124. In such an embodiment, the processor 110 may include the noise vector synchronization and scaling block 128 which is coupled via link 126 to a noise vector control block 130 in the radio transceiver 112. The platforms 100 of FIG. 1A and FIG. 1B are capable of cancelling noise radiated from bus and clock board or package traces and power planes of the platform 100 and further are capable of cancelling conducted noise. In general, the platforms 100 of FIG. 1A and FIG. 1B cancel radio interference noise 120 by generating a measure of the bus and/or clock noise at the noise source, providing this information to the radio transceiver 112 over the link 126, and cancelling the platform interference in the baseband digital signal processor (DSP) of the radio transceiver 112. In one or more embodiments, such platform interference cancellation may be a fully digital solution and may be more flexible than Radio Interference Mitigation (RIM) and Adaptive Clocking Technology (ACT) in handling clock noise. The platforms 100 are capable of mitigating noise from clocks having new, non-conventional spread spectrum profiles which RIM cannot currently address, and further is not limited by clock parameter tolerances as ACT technology is. It is also able to deal with non-clock noise sources which RIM and ACT cannot. The approach implemented by platforms 100 may be simpler and easier to implement than radio frequency interference (RFI) encoding since the present approach does not need to be customized for each bus type, does not require modifications to existing interfaces, I/O standards or bus link circuits and components. In addition, the present approach does not impose any power or performance penalty on existing buses. In one or more embodiments, one uniqueness of the approach to platform wireless noise mitigation as shown in FIG. 1A and FIG. 1B exists in the digital calculation of noise vectors with noise vector generator 124 at a low speed in the computing silicon of processor 110 and the simple subtraction of scaled versions of these noise vectors from the radio baseband vectors. However, the scope of the claimed subject matter is not limited in these respects. Further details of how such platform noise cancellation may be implemented where radio transceiver comprises an orthogonal frequency-division multiplexing (OFDM) system are discussed with respect to FIGS. 2A-2C through FIG. 5, below. Although an OFDM system is discussed for purposes of example, it should be noted cancellation of platform radio-frequency interference may likewise be applied to Global Positioning System (GPS) systems, cellular systems, Bluetooth systems, and in general any radio system, and the scope of the claimed subject matter is not limited in this respect.

Figure 2A:
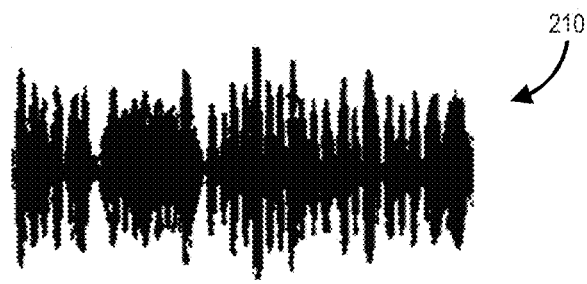
Figure 2B:
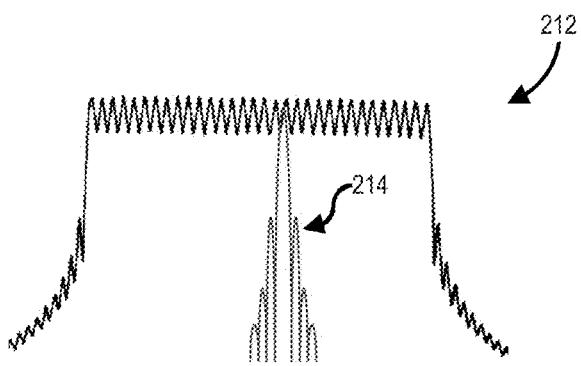
Figure 2C:
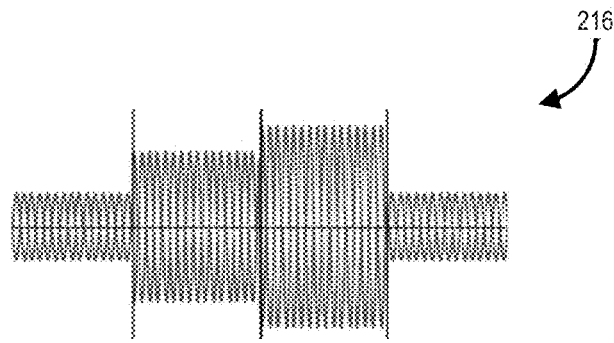

Referring now to FIGS. 2A, 2B, and 2C, orthogonal frequency-division multiplexing (OFDM) graphs is in accordance with one or more embodiments will be discussed. FIG. 2A shows an orthogonal frequency-division multiplexing (OFDM) quadrature amplitude modulation (QAM) radio-frequency (RF) signal 210, FIG. 2B shows the corresponding radio-frequency (RF) spectrum 212 including one component due to one particular OFDM carrier 214, and FIG. 2C shows the signal envelope 216 of a single OFDM carrier. Noise cancellation in accordance with one or more embodiments will be described herein in terms of orthogonal frequency division multiplexing (OFDM) with quadrature amplitude modulation (QAM) which is one particular technology used in modern digital radios such as a wireless local area network (WLAN) or a Wi-Fi network as set forth by the Wi-Fi alliance in accordance with an Institute of Electrical and Electronics Engineers (IEEE) standard including but not limited to IEEE 802.11a/b/g/n, a mobile broadband network such as a Long Term Evolution (LTE) network or an Long Term Evolution Advanced (LTE-Advanced) network, or a Worldwide interoperability for Microwave access (WiMax) network in accordance with an IEEE 802.16e standard and/or a WiMAX-II network in accordance with an IEEE 802.16m standard, or a Digital Video Broadcasting (DVB) network, and so on. Most legacy network standards such as non-OFDM, binary phase-shift keying (BPSK), quaternary phase-shift keying (QPSK), and so on, may be considered a subset of ODFM technology and may be easily handled. An example RF signal envelope for an OFDM QAM system is shown on in FIG. 2C. The OFDM QAM signal 210 is a superposition of many OFDM carriers, each modulated at a symbol rate of T. The spectrum of this signal 210 of FIG. 2A is shown in FIG. 2B as spectrum 212. The carriers are spaced 1/T apart in frequency. One particular carrier in spectrum 212 is shown at 214. The plot 216 shown in FIG. 2C shows the envelope of the component of the total RF signal which is due to this single carrier 214 of FIG. 2B. The symbol modulation, for example T=4 microseconds (µs) be seen in FIG. 2C. The plot 216 of FIG. 2C may represent four symbols for example, although the scope of the claimed subject matter is not limited in this respect. It is noted that the effects of transmit baseband filtering are not shown for purposes of clarity. An example of how the single OFDM carrier is processed by a receiver is shown in and described with respect to FIG. 3, below.

Figure 3:
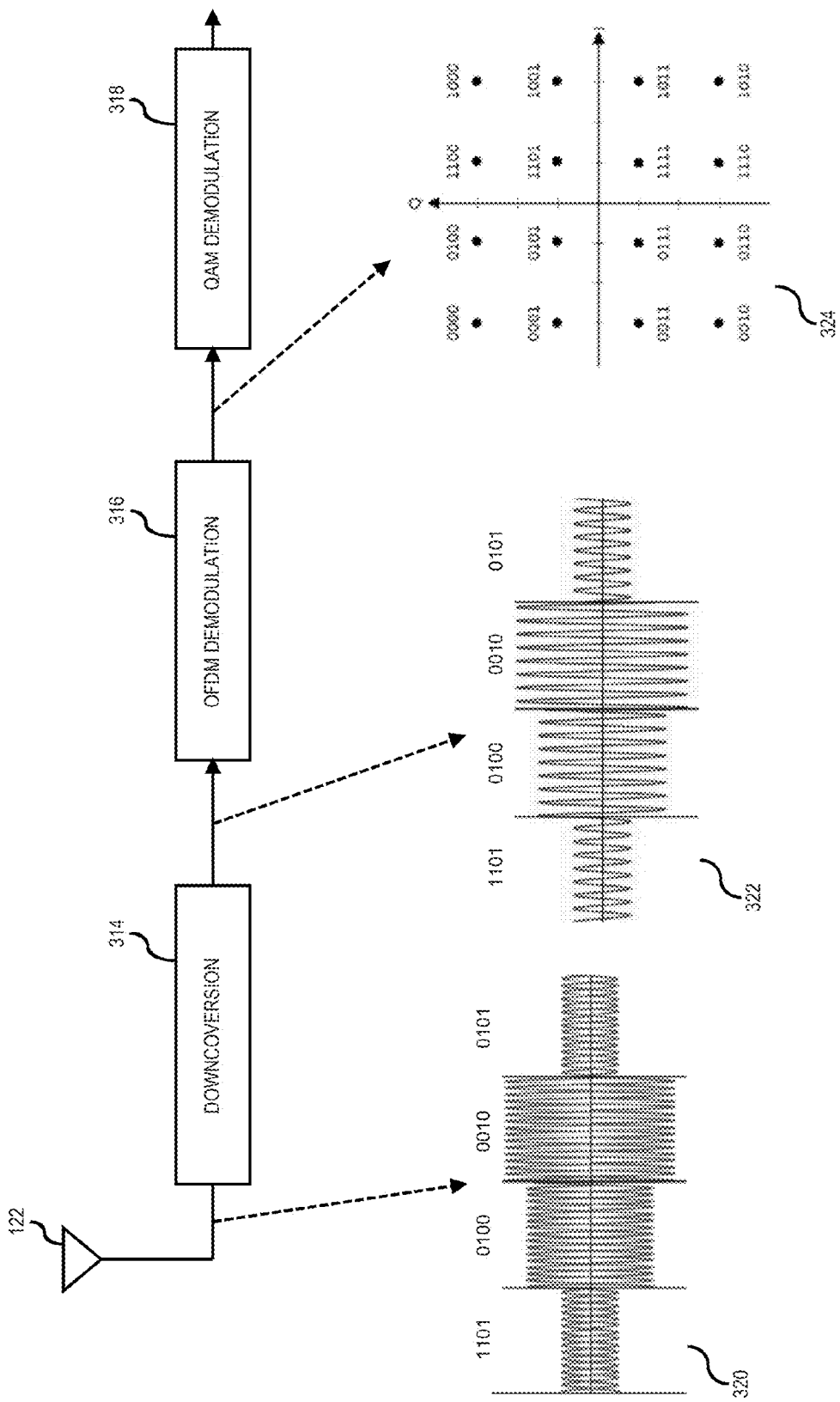
FIG. 3 is a diagram of the various signal components in an OFDM receiver in accordance with one or more embodiments.

Referring now to FIG. 3, a diagram of the various signal components in an OFDM receiver in accordance with one or more embodiments will be discussed. The physical layer (PHY) of an OFDM QAM receiver 310 is shown in FIG. 3, along with signal plots 320, 322, and 324, at various points in the receive chain. Since actual signals are a superposition of multiple OFDM carriers and are too complex for simple illustration, the signal components for only one particular carrier are shown for purposes of discussion. The RF signal is amplitude modulated by a sinusoidal signal having particular amplitude and phase in each symbol period as shown by the RF envelope at plot 320. The RF carriers received at antenna 122 are removed by a down converter 314, and the desired baseband modulation signal is recovered via OFDM demodulator after the receiver (RX) filter as shown at plot 322. This signal of plot 322 should be a sinusoid with the intended magnitude and phase in each symbol period. The magnitude and phase can be thought of as a vector in the complex plane, with corresponding real and imaginary components called the in-phase ("I") and Quadrature ("Q") components. The OFDM demodulator determines these I and Q components from the baseband signal 322. The collection of received I-Q values may be plotted in the complex plane as a constellation diagram for example as shown in plot 324. The QAM demodulator 318 then maps the baseband I-Q vectors to binary data streams to recover the data encoded in the received signal.

Figure 4:
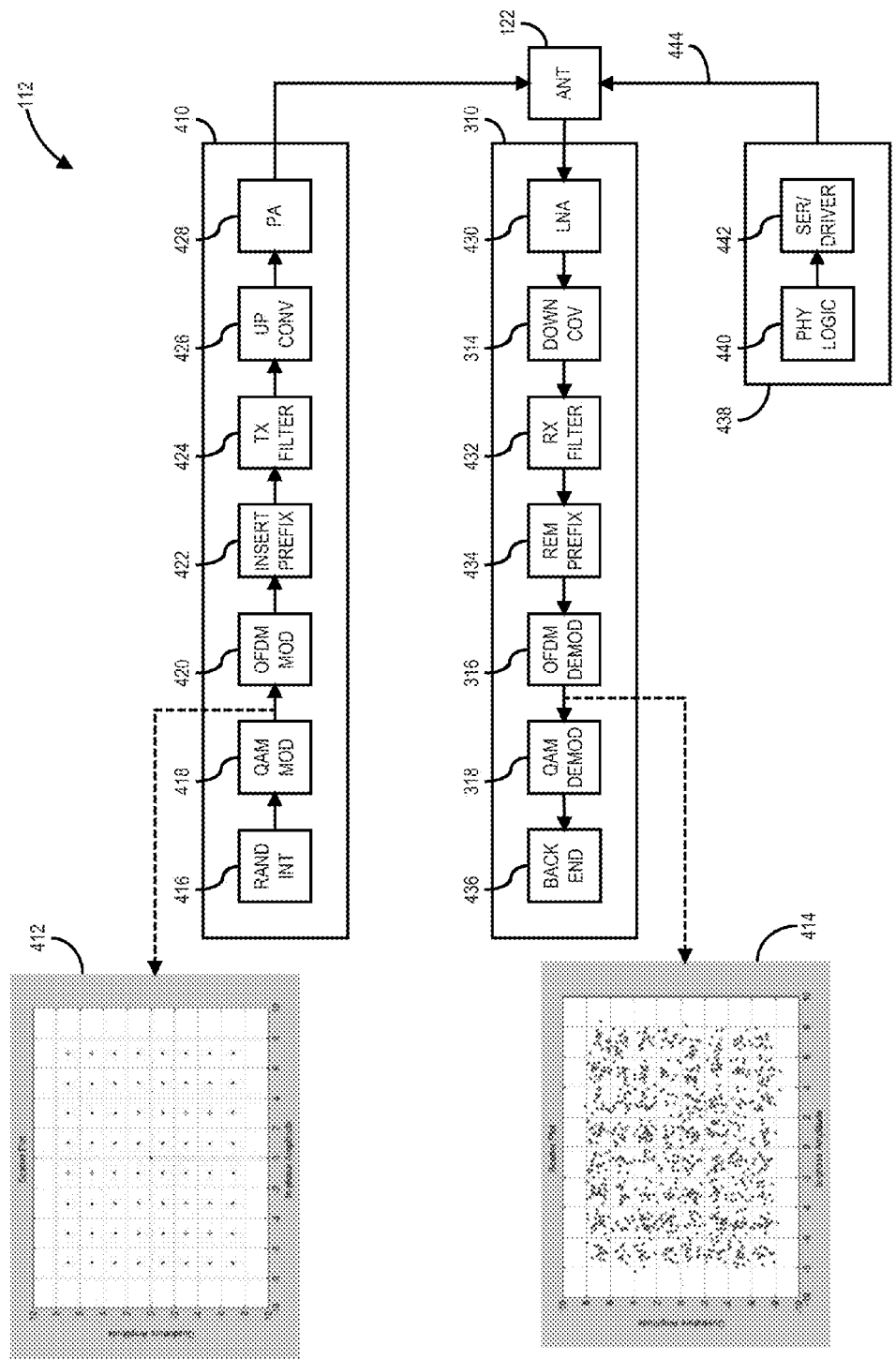
FIG. 4 is a diagram of an OFDM transmitter and OFDM receiver illustrating a transmitted constellation from the transmitter and a received constellation with platform radio-frequency interference (RFI) in accordance with one or more embodiments.

Referring now to FIG. 4, a diagram of an OFDM transmitter and OFDM receiver illustrating a transmitted constellation from the transmitter and a received constellation with radio-frequency interference (RFI) in accordance with one or more embodiments will be discussed. For purposes of example, FIG. 4 illustrates simulation model and results for an IEEE 802.11n Wi-Fi radio system in the presence of noise from a double data rate (DDR) 1600 megatransfer per second (DDR-1600) memory bus 438. The noise from the bus 438 was modeled to cause a 7.5% symbol error rate in this example. A simulation Wi-Fi constellation transmitted by transmitter 410 is shown at plot 412. All OFDM carriers are included in this example simulation. A random integer generator 416 is used to model the source data to the transmitter 410 in this simulation. The transmitter 410 may comprise a QAM modulator 418, OFDM modulator 420, insert prefix block 422, transmission (TX) filter 424 which may comprise a square root filter, up converter 426, and power amplifier (PA) 428. The effect of platform radio frequency interference (RFI) coupled into the receiver 310 from a nearby data bus 438 comprising a PHY layer logic block 440 and serializer/driver block 442 coupled to antenna 122 via noise path 444 can be seen in plot 414. The receiver 310 may comprise a low noise amplifier (LNA) 430, down converter 314, receiver (RX) filter 432, remove prefix block 434, OFDM demodulator 316, QAM demodulator 318, and back end processor block 436. Each dot in the plot 414 represents one received I-Q vector. There is one dot for each OFDM carrier at each symbol time. The difference between the received vectors of plot 414 and the corresponding vectors sent by the transmitter 410 of plot 412 are error vectors (EV) introduced by the radio-frequency interference (RFI). It should be note that in general, any noise or interference generate in or by the platform 100 may be referred to as platform interference, and in general such interference may interfere with one or more radios of the platform 100 at radio frequencies, so such platform interference may also be referred to as radio frequency interference, noise, platform noise, or platform radio frequency interference. However, the scope of the claimed subject matter is not limited in this respect. Such error vectors may prevent the QAM demodulator 318 from recovering the intended data reliably. It is noted that other noise mechanisms normally present in wireless systems are neglected for clarity. However, the simulations show that the approach for noise cancellation described herein is robust in the presence of such effects. A block diagram of how the noise cancellation approach may be implemented in platform 100 is shown in and described with respect to FIG. 5, below.

Figure 5:
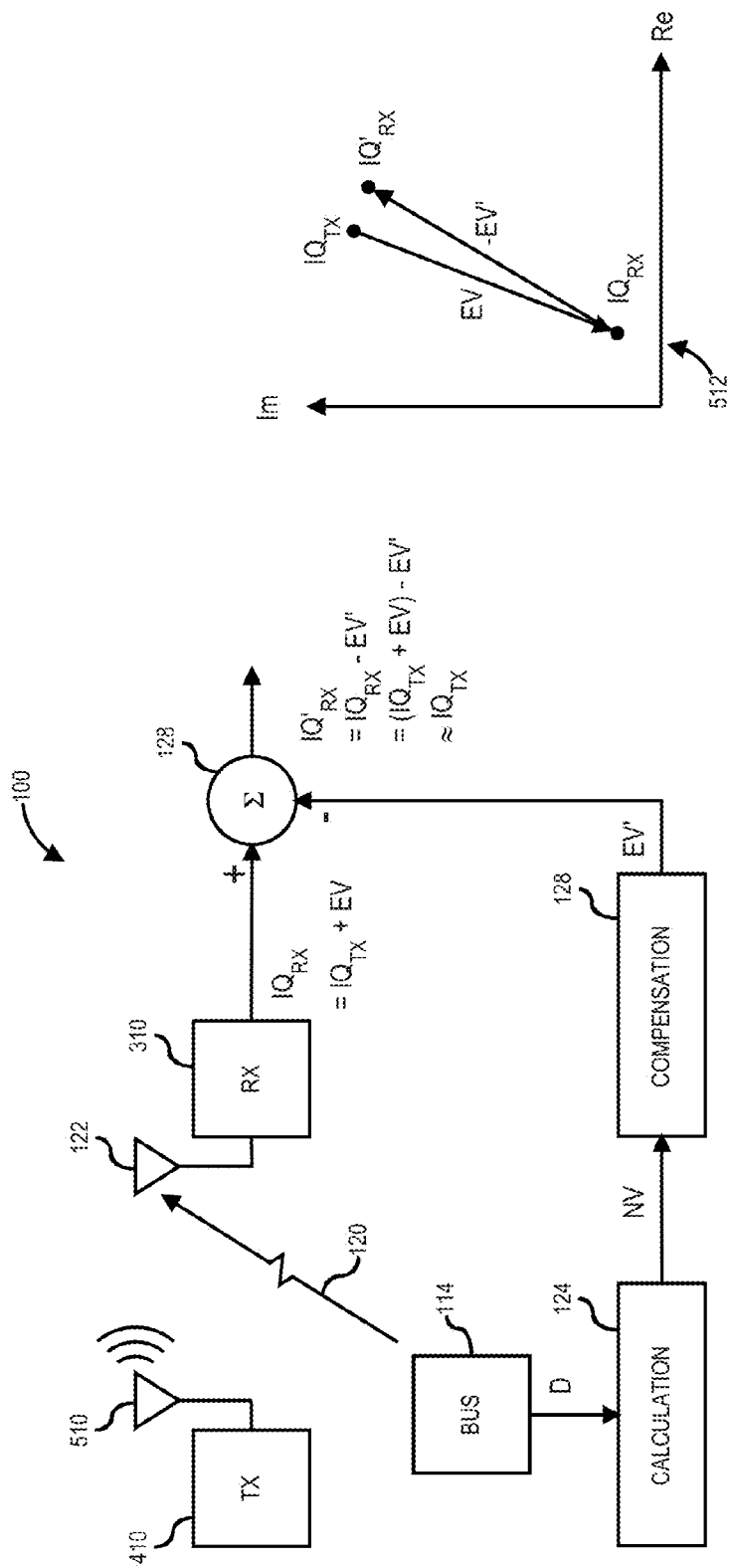
FIG. 5 is a block diagram of a platform capable of cancelling platform radio interference in accordance with one or more embodiments.

Referring now to FIG. 5, a block diagram of basic components of a platform capable of cancelling platform radio interference in accordance with one or more embodiments will be discussed. In platform 100, transmitter (TX) 410 represents a wireless transmitter and receiver (RX) 310 represents the first stages of the wireless receiver of platform 100. Although platform 100 may include a transmitter as a component of radio transceiver 112, typically the signals received by the receiver 310 of platform 100 are transmitted from a remote device wherein the transmitter 410 is part of the remote device and not part of platform 100. Bus noise from bus (BUS or I/O) 114 introduces an error vector, EV, into the received baseband vector $IQ_{RX}$. Noise vectors, NV, are calculated at calculation block 124 from bus data, D, and scaled for the noise coupling path and the front end of receiver 310 at noise vector and scaling (compensation) block 128 to find estimated error vectors, EV'. The estimated error vectors EV' are finally subtracted from the baseband I-Q vectors to get enhanced baseband vectors, $IQ'_{RX}$. The effect of the error vector on the transmitted vector at the received baseband vector, and the effect of subtracting the estimated error vector from the received baseband vector to result in the enhanced baseband vector, is shown at plot 512 wherein the vectors are plotted along real and imaginary axes as a complex numbers.

The effects of the noise interference 120 can be removed if the error vectors can be determined and subtracted from the received I-Q vectors prior to QAM demodulator 318 as shown in FIG. 4 and FIG. 5. Analysis of the receive signal chain shows that the error vector of each carrier in each symbol period is proportional to the value at the carrier frequency of the complex spectrum of the bus noise D at bus 114 when the spectrum is taken over the symbol period. The complex constant of proportionality depends on the noise coupling and radio front end gain and phase response. In one or more embodiments, the bus or clock noise vectors, N, are calculated for each carrier and symbol time based on the bus or clock signal, D, scaled for the gain and phase of the noise coupling path and receiver front end, and then the estimated error vectors, EV', are subtracted from the received I-Q vectors $IQ_{RX}$. A block diagram of a platform 100 capable of estimating a noise vector, scaling the noise vector, and subtracting the noise vector from a received baseband signal is shown in and described with respect to FIG. 6A, below.

Figure 6A:
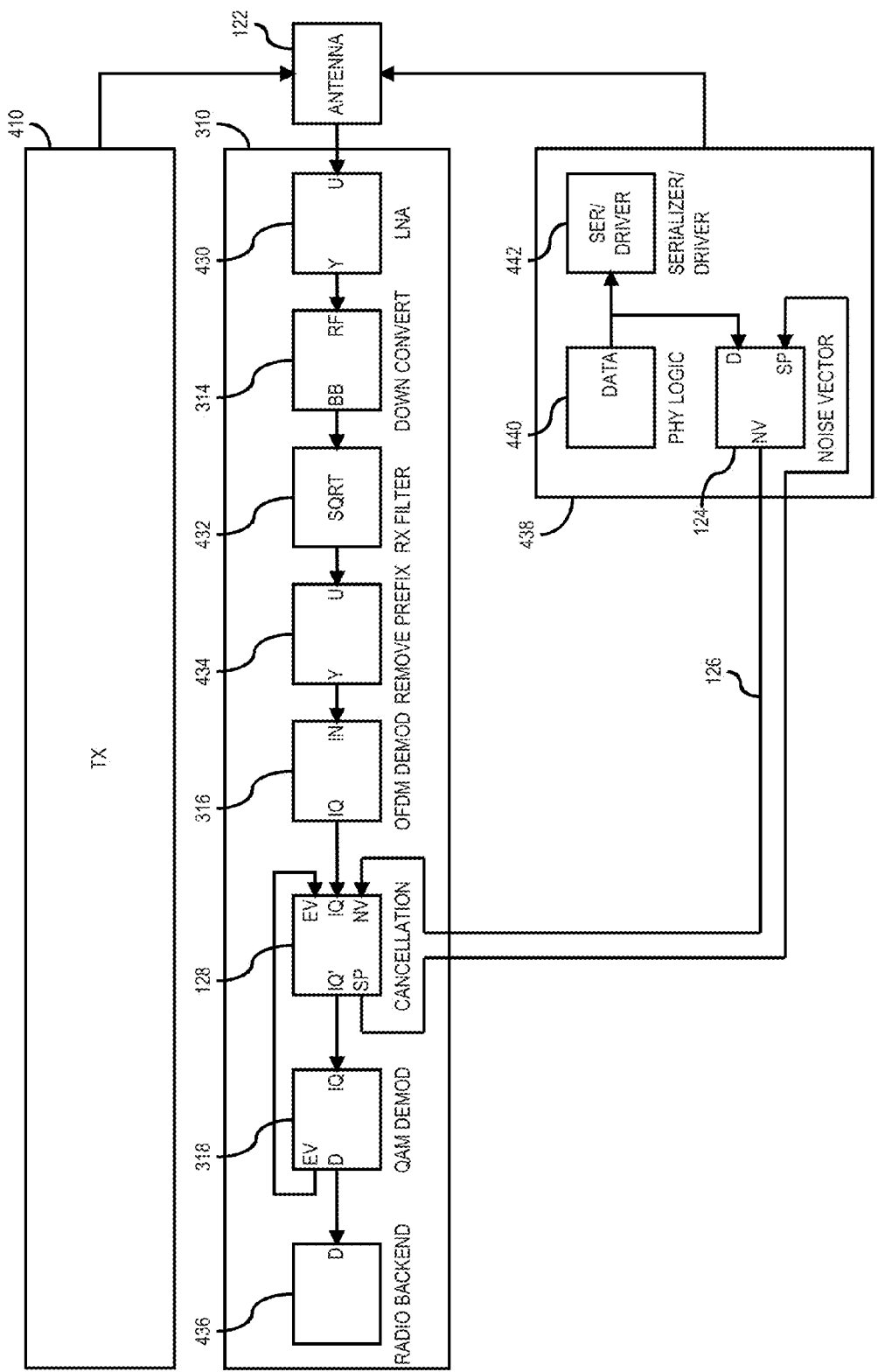
FIG. 6A is a block diagram of example detailed components of a platform capable of cancelling platform radio interference.
Figure 6C:
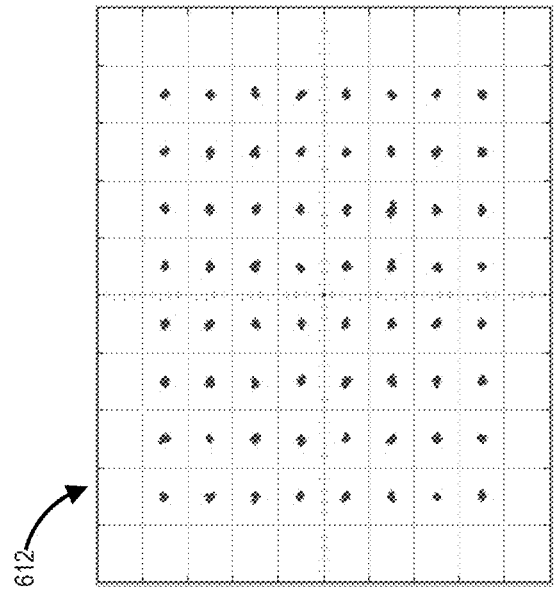
FIGS. 6B and 6C are example simulation results of the cancellation of radio interference in accordance with one or more embodiments.
Figure 6B:
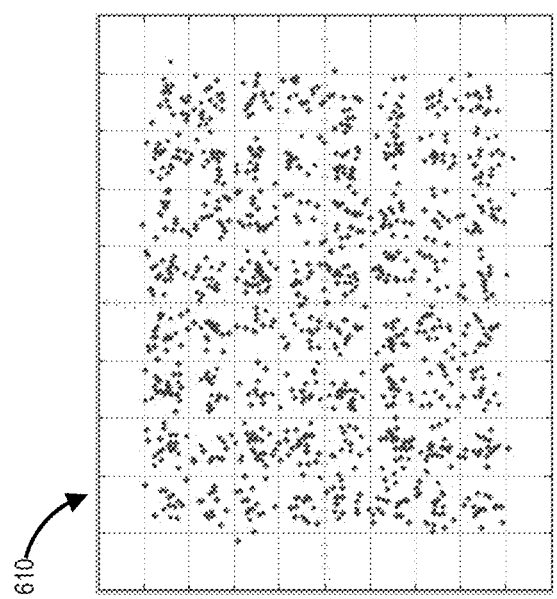

Referring now to FIG. 6A, a block diagram of example detailed platform capable of cancelling platform radio interference, and FIGS. 6B and 6C representing example simulation results of the cancellation of radio interference in accordance with one or more embodiments will be discussed. In the embodiment shown in FIG. 6A, logic to implement noise vector generator 124 is added to the bus or clock block 438 to calculate the noise vector. This noise vector is sent as a digital word to the radio receiver over a low-speed digital interface or link 126, which may comprise a link having a speed of about 15 MB/s for Wi-Fi in one or more embodiments. The noise vector amplitude and phase are adaptively scaled for the RF coupling path and the front end stages of receiver 310 then digitally subtracted from the received baseband I-Q vector in block 128 in the radio receiver 310. FIG. 6B shows the received constellation plot 610 with radio-frequency interference (RFI) noise showing a symbol error rate of 7.5% per the simulation, and FIG. 6C shows the received constellation with cancellation of the RFI at plot 612 via subtraction of the estimated error vectors EV' from the received baseband signal wherein the symbol error rate is effectively reduced to about 0%.

In one or more embodiments, the manner in which spectral noise vectors are calculated will result in cancellation of the RFI noise. One approach may comprise processing bus data through a replica of the radio down conversion and baseband signal processing. Digital down conversion (DDC) may be employed for a fully digital implementation. Such an approach would involve adding significant complexity and high-speed processing to the bus PHY block 440. In another embodiment, a discrete Fourier transform (DFT) may be applied to the bus data. The length of the DFT may involve many sampling points to achieve the desired frequency resolution at the radio carrier frequency. In a particular embodiment, a simpler approach involves calculating the noise vectors only at the needed OFDM carrier frequencies. An example approach for phasor-based line coding applications is described in International Application No. PCT/US2011/054498 filed Oct. 1, 2011 by the assignee of the present application. Said Application No. PCT/US2011/054498 is hereby incorporated herein by reference in its entirety. In such an approach, the noise vectors may be calculated by noise vector generator 124 using the following formula:

$$NV = \sum_{b=1}^{n} x_b e^{-i2\pi b f_r / f_{BR}}$$

where $f_r$ is the OFDM carrier frequency, $x_b$ is the bus data at bit time b and $f_{BR}$ is the bus bit rate, the transfer rate of a single bus lane. The sum is taken over the radio symbol period. Note that $x_b$ does not need to be binary. Such an approach may be applied to multiple lanes of bus data simultaneously by adding the binary values of each lane together to form an equivalent multi-valued data signal. In addition, $f_{BR}$ may be a fixed parameter or it may be varied in synchronization with any spread spectrum clocking (SSC) utilized in the noise source. Such an approach may be easily extended for buses having transmit pre-equalization by adding another term in the summation. An example block diagram of a noise vector generator 124 is shown in and described with respect to FIG. 7, below.

Figure 7:
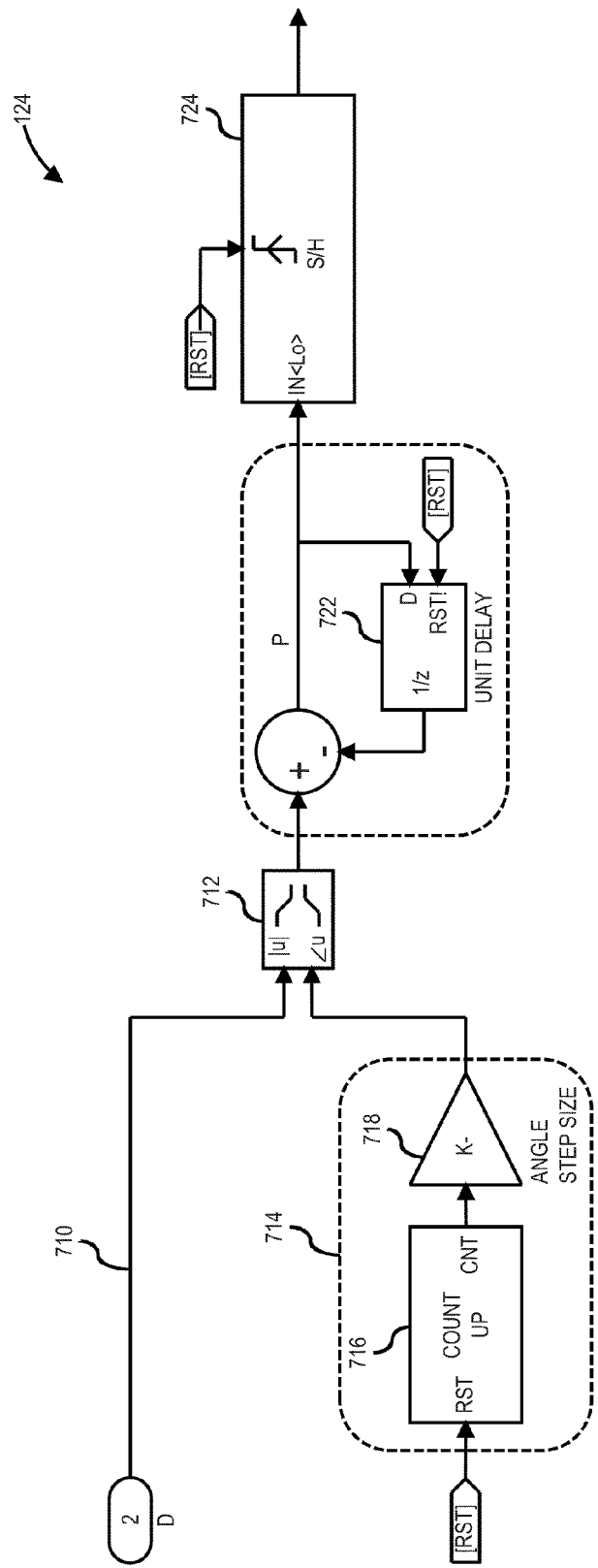
FIG. 7 is a block diagram of a noise vector generator in accordance with one or more embodiments.

Referring now to FIG. 7, a block diagram of a noise vector generator in accordance with one or more embodiments will be discussed. FIG. 7 illustrates one embodiment to implement noise vector generator 124. The bus data 710 may comprise a single lane or a sum over multiple lanes and serves as the magnitude input to magnitude-angle to complex block 712 for bit phasors. Bit phasors have phase angles proportional to their bit time, the inverse of bit rate in a non-SSC case as shown in the equation discussed, above. Bit phasors are accumulated at bit phase accumulator block over the symbol period T of the radio using a bit-rate unit delay block 722 and clocked out to the radio receiver 310 once per radio symbol period via sample and hold block 724. A symbol synchronization signal supplied by the radio receiver 310 controls the timing of the accumulation. This signal can be realized by a 250 kHz clock signal having a 4 μs period for example in the case of a Wi-Fi radio transceiver 112. For LTE or WiMax networks which employ many more carriers, symbol times are over ten times longer and as a result synchronization is even less timing critical.

The phase angle increment per bus bit time is slightly different for each OFDM carrier since each carrier has a slightly different RF frequency. It is a fixed value for each carrier if the bus clock is unspread, but otherwise it may vary with the clock spreading profile. The phase angle is incremented by angle increment block 714 which multiplies the output of a single counter 716 by the appropriate angle step size 718 for each carrier to generate the incrementing phase angle input to magnitude-angle to complex block 712. There are several alternative methods for accomplishing the functions described above, for example frame rate processing using simple vector operations which has been simulated with similar results to the bit-rate processing example.

Figure 8A:
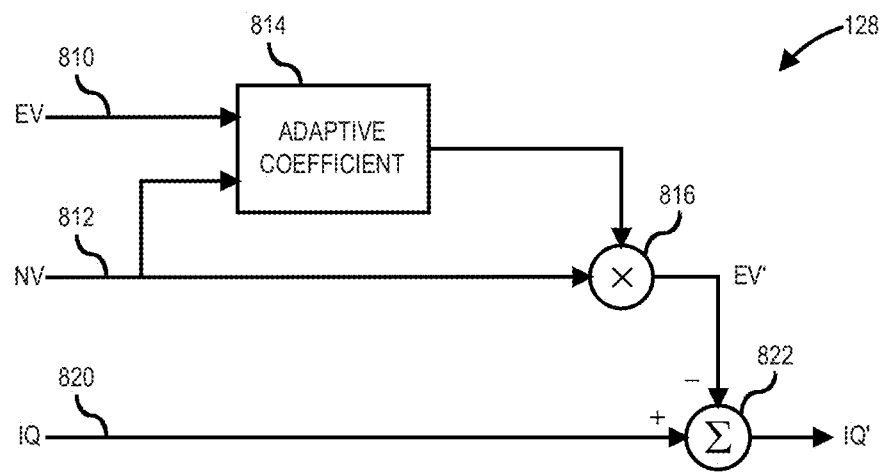
FIGS. 8A and 8B are block diagrams of noise vector scaling and subtraction and noise vector synchronization circuits in accordance with one or more embodiments.
Figure 8B:
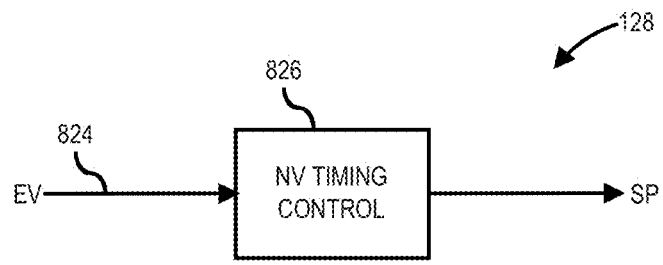

Referring now to FIGS. 8A and 8B, block diagrams of noise vector scaling and subtraction and noise vector synchronization in accordance with one or more embodiments will be discussed. FIG. 8A shows a single order adaptive filter embodiment to implement the noise vector scaling and subtraction portion of cancellation block 128 for subtracting estimated error vectors from the received baseband signal. The error vector EV is applied to input line 810 to an adaptive coefficient block 814, and the calculated noise vector NV is applied to the input line 812 to the adaptive coefficient block 814. The adaptive coefficient block 814 determines the complex scale factor for the noise vector NV to estimate the amplitude and phase effects for the bus noise coupling physics and for the front end circuits of the wireless receiver 310. The output of the adaptive filter 814 is multiplied by the noise vector at multiplier 816 to result in the estimated error vector EV'. The baseband in-phase and quadrature vector IQ is applied to an input line 820 feeding a summation circuit 822 which subtracts the estimated error vector EV' from the baseband vector IQ to result in the baseband in-phase and quadrature vector after noise cancellation IQ'. In one or more embodiments, the vector magnitude may be scaled by a factor to match the strength of noise coupling into the receiver 310 and the receiver front end gain. Scaling may also involve adding a constant to the vector phase to match the noise propagation time and the phase shift at the front end of the receiver 310. These parameters may differ slightly between OFDM carriers. However, a single value may be utilized without significant downside in many cases. The scaling parameters may be suitable to account for the effects of various types of noise coupling paths and mechanisms. For example, the scaling factors are as effective for noise conducted through power delivery networks and noise radiated from package power planes as they are for noise radiated from signal traces. In one or more embodiments, scaling values can be determined adaptively based on error vector magnitude (EVM), for example by utilizing techniques for optimizing local oscillator phase, front end gain and/or symbol sampling alignment.

FIG. 8B shows the noise vector synchronization portion of noise vector scaling and synchronization block 128. In one or more embodiments, adaptive techniques may also be employed to synchronize the bus noise vector calculation to the radio symbol time. For example, as shown in FIG. 8B, the error vector EV may be applied to an input line 824 to a noise vector timing control circuit 826 to generate a synchronization pulse SP at the symbol rate of the receiver 310 to synchronize the bus noise vector generation. Any one or several types of common algorithms may be utilized for such synchronization, for example a slope descent algorithm. However, the scope of the claimed subject matter is not limited in this respect. Re-scaling occasionally may be utilized to compensate for changes in the noise coupling path or front end gain.

Figure 9:
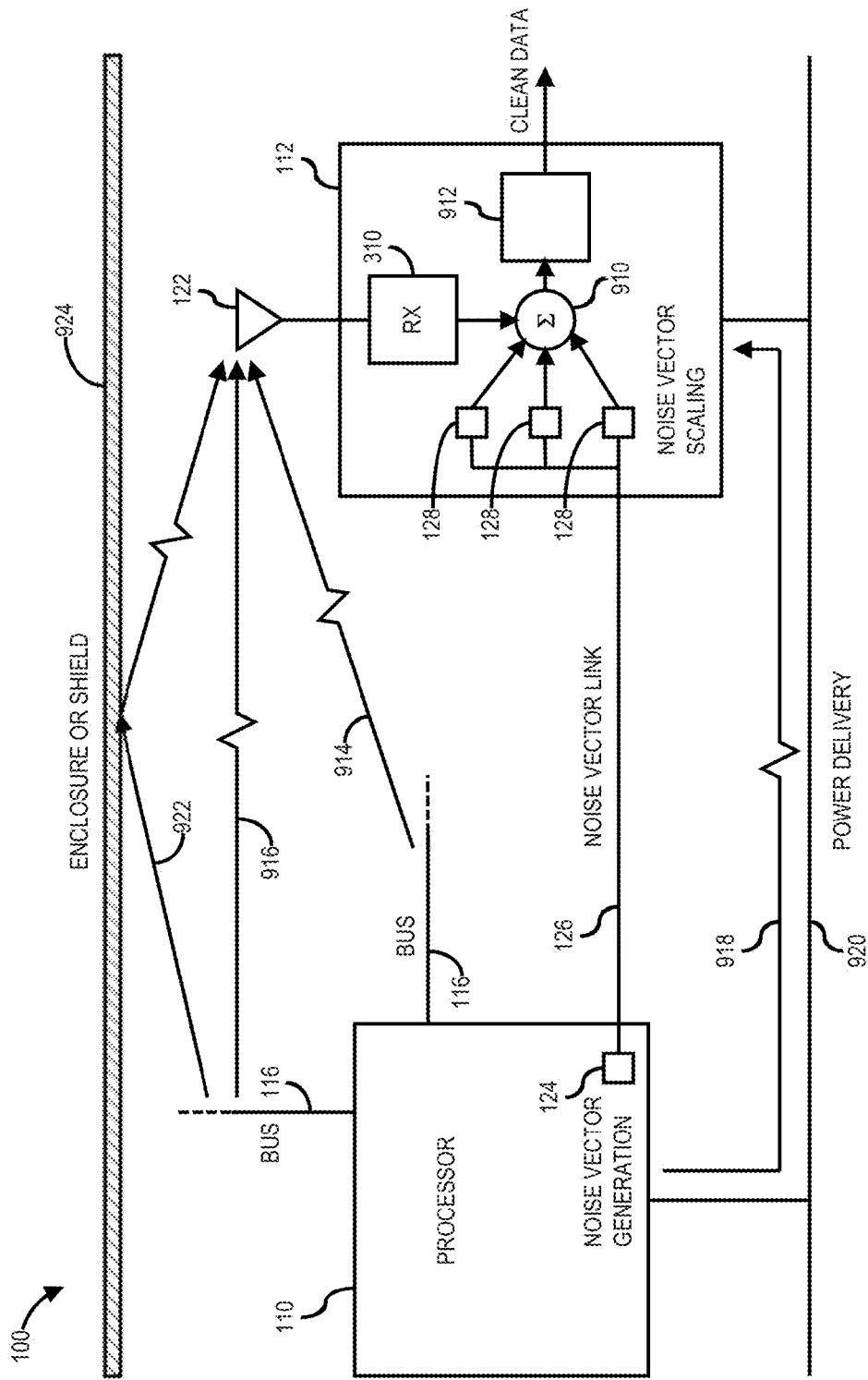
FIG. 9 is a block diagram of a platform implementing multi-tap phasor cancellation for multi-path noise cancellation in accordance with one or more embodiments.

Referring now to FIG. 9, a block diagram of a platform implementing multi-tap phasor cancellation for multi-path noise cancellation in accordance with one or more embodiments will be discussed. As shown in FIG. 9, the first order or single-tap noise cancellation as shown in FIG. 8A may be extended to multi-tap noise cancellation as shown in FIG. 9. In such an embodiment, the noise vector link 126 may provide noise vectors from noise vector generator 124 to multiple noise vector scaling and synchronization blocks 128. Each noise vector scaling and synchronization block 128 may process the noise from a respective noise source, and their outputs are combined at a summing circuit 910 to provide clean data as an output from baseband processor 912. Such a multi-tap arrangement allows cancellation of noise finding its way into the radio transceiver 112 from multiple noise sources such as noise 914 and 916 from multiple bus traces 116, or noise 918 from power delivery traces, or through multiple coupling paths such as multipath noise 922 from bus 116 reflected off of an enclosure or shield of platform 100.

Figure 10:
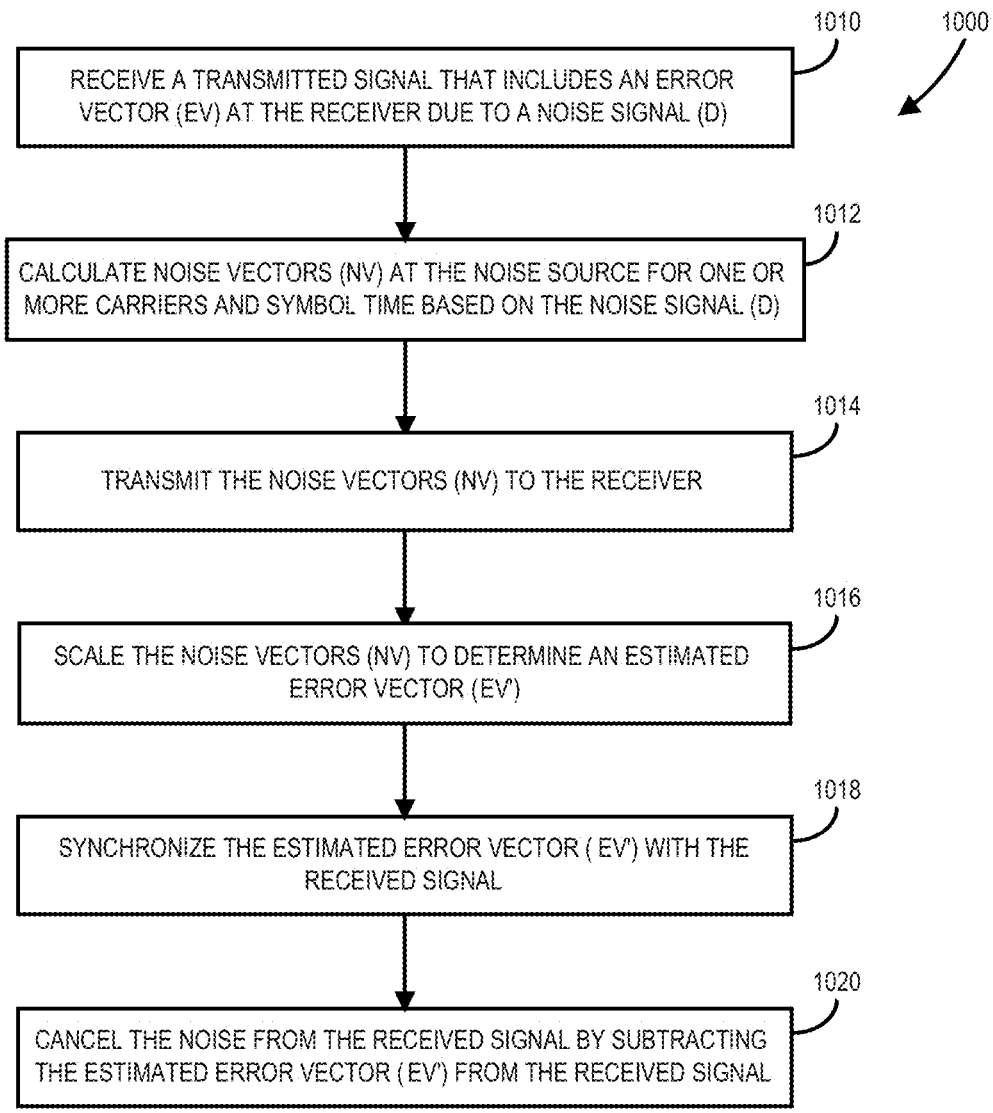
FIG. 10 is a flow diagram of a method to cancel platform radio interference in accordance with one or more embodiments.

Referring now to FIG. 10, a flow diagram of a method to cancel platform radio interference in accordance with one or more embodiments will be discussed. Method 1000 may include more or fewer blocks than shown in FIG. 10, and/or the blocks maybe arranged in various other orders than shown, and the scope of the claimed subject matter is not limited in this respect. A transmitted signal may be received at block 1010 wherein the signal includes an error vector introduced at the receiver due to some noise signal generated by or in the platform 100. Noise vectors representing the noise signal may be calculated at block 1012 at the noise source for one or more carriers and symbol time based at least in part on the noise signal. The calculated noise vectors are transmitted at block 1014 to the receiver 310 of the radio transceiver 112, and the noise vectors are scaled at block 1016 to arrive at estimated error vectors. The estimated error vectors are synchronized with the received signal at block 1018, and the noise is cancelled from the received signal by subtracting the estimated error vectors from the received signal at block 1020.

Figure 11:
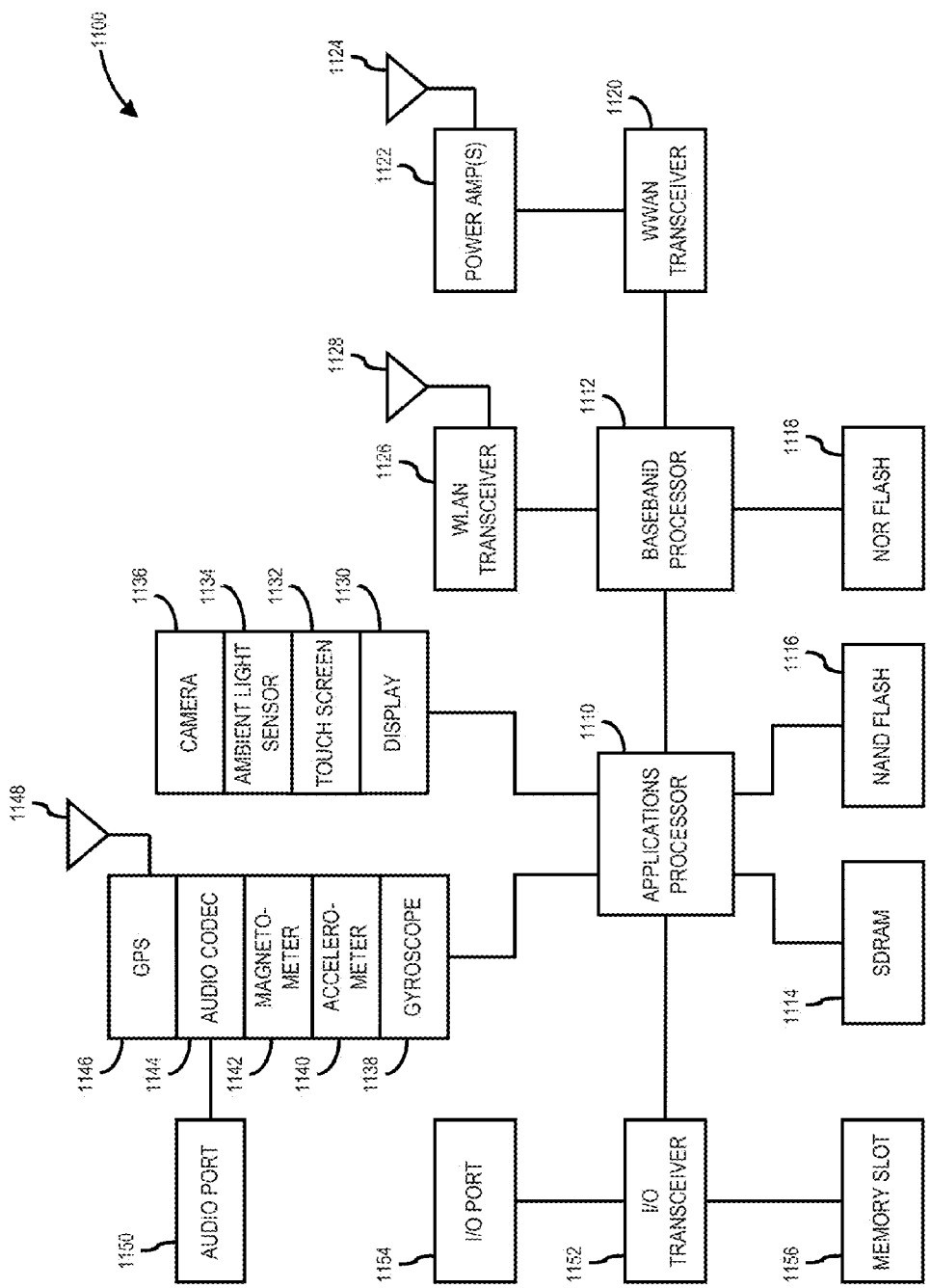
FIG. 11 is a block diagram of an information handling system capable of baseband cancellation of platform radio interference in accordance with one or more embodiments.

Referring now to FIG. 11, a block diagram of an information handling system capable of baseband cancellation of platform radio interference in accordance with one or more embodiments will be discussed. Information handling system 1100 of FIG. 11 may tangibly embody one or more of any of the network elements or devices of platform 100 as shown in and described with respect to FIG. 1, with greater or fever components depending on the hardware specifications of the particular device or network element. Although information handling system 1100 represents one example of several types of computing platforms, information handling system 1100 may include more or fewer elements and/or different arrangements of elements than shown in FIG. 11, and the scope of the claimed subject matter is not limited in these respects.

In one or more embodiments, information handling system 1100 may include an applications processor 1110 and a baseband processor 1112. Applications processor 1110 may be utilized as a general purpose processor to run applications and the various subsystems for information handling system 1100. Applications processor 1110 may include a single core or alternatively may include multiple processing cores wherein one or more of the cores may comprise a digital signal processor or digital signal processing core. Furthermore, applications processor 1110 may include a graphics processor or coprocessor disposed on the same chip, or alternatively a graphics processor coupled to applications processor 1110 may comprise a separate, discrete graphics chip. Applications processor 1110 may include on board memory such as cache memory, and further may be coupled to external memory devices such as synchronous dynamic random access memory (SDRAM) 1114 for storing and/or executing applications during operation, and NAND flash 1116 for storing applications and/or data even when information handling system 1100 is powered off. In general, any of the memory devices of information handling system 1100 may comprise an article of manufacture having instructions stored thereon that cause a processor of the information handling system 1100 to execute the instructions to implement any method or process wholly or in part as described herein. Baseband processor 1112 may control the broadband radio functions for information handling system 1100. Baseband processor 1112 may store code for controlling such broadband radio functions in a NOR flash 1118. Baseband processor 1112 controls a wireless wide area network (WWAN) transceiver 1120 which is used for modulating and/or demodulating broadband network signals, for example for communicating via a Wi-Fi, LTE or WiMAX network or the like as discussed herein. The WWAN transceiver 1120 couples to one or more power amps 1122 respectively coupled to one or more antennas 1124 for sending and receiving radio-frequency signals via the WWAN broadband network. The baseband processor 1112 also may control a wireless local area network (WLAN) transceiver 1126 coupled to one or more suitable antennas 1128 and which may be capable of communicating via a Wi-Fi, Bluetooth, and/or an amplitude modulation (AM) or frequency modulation (FM) radio standard including an IEEE 802.11 a/b/g/n standard or the like. It should be noted that these are merely example implementations for applications processor 1110 and baseband processor 1112, and the scope of the claimed subject matter is not limited in these respects. For example, any one or more of SDRAM 1114, NAND flash 1116 and/or NOR flash 1118 may comprise other types of memory technology such as magnetic memory, chalcogenide memory, phase change memory, or ovonic memory, and the scope of the claimed subject matter is not limited in this respect.

In one or more embodiments, applications processor 1110 may drive a display 1130 for displaying various information or data, and may further receive touch input from a user via a touch screen 1132 for example via a finger or a stylus. An ambient tight sensor 1134 may be utilized to detect an amount of ambient tight in which information handling system 1100 is operating, for example to control a brightness or contrast value for display 1130 as a function of the intensity of ambient tight detected by ambient light sensor 1134. One or more cameras 1136 may be utilized to capture images that are processed by applications processor 1110 and/or at least temporarily stored in NAND flash 1116. Furthermore, applications processor may couple to a gyroscope 1138, accelerometer 1140, magnetometer 1142, audio coder/decoder (CODEC) 1144, and/or global positioning system (GPS) controller 1146 coupled to an appropriate GPS antenna 1148, for detection of various environmental properties including location, movement, and/or orientation of information handling system 1100. Alternatively, controller 1146 may comprise a Global Navigation Satellite System (GNSS) controller. Audio CODEC 1144 may be coupled to one or more audio ports 1150 to provide microphone input and speaker outputs either via internal devices and/or via external devices coupled to information handling system via the audio ports 1150, for example via a headphone and microphone jack. In addition, applications processor 1110 may couple to one or more input/output (I/O) transceivers 1152 to couple to one or more I/O ports 1154 such as a universal serial bus (USB) port, a high-definition multimedia interface (HDMI) port, a serial port, and so on. Furthermore, one or more of the I/O transceivers 1152 may couple to one or more memory slots 1156 for optional removable memory such as secure digital (SD) card or a subscriber identity module (SIM) card, although the scope of the claimed subject matter is not limited in these respects.

Figure 12:
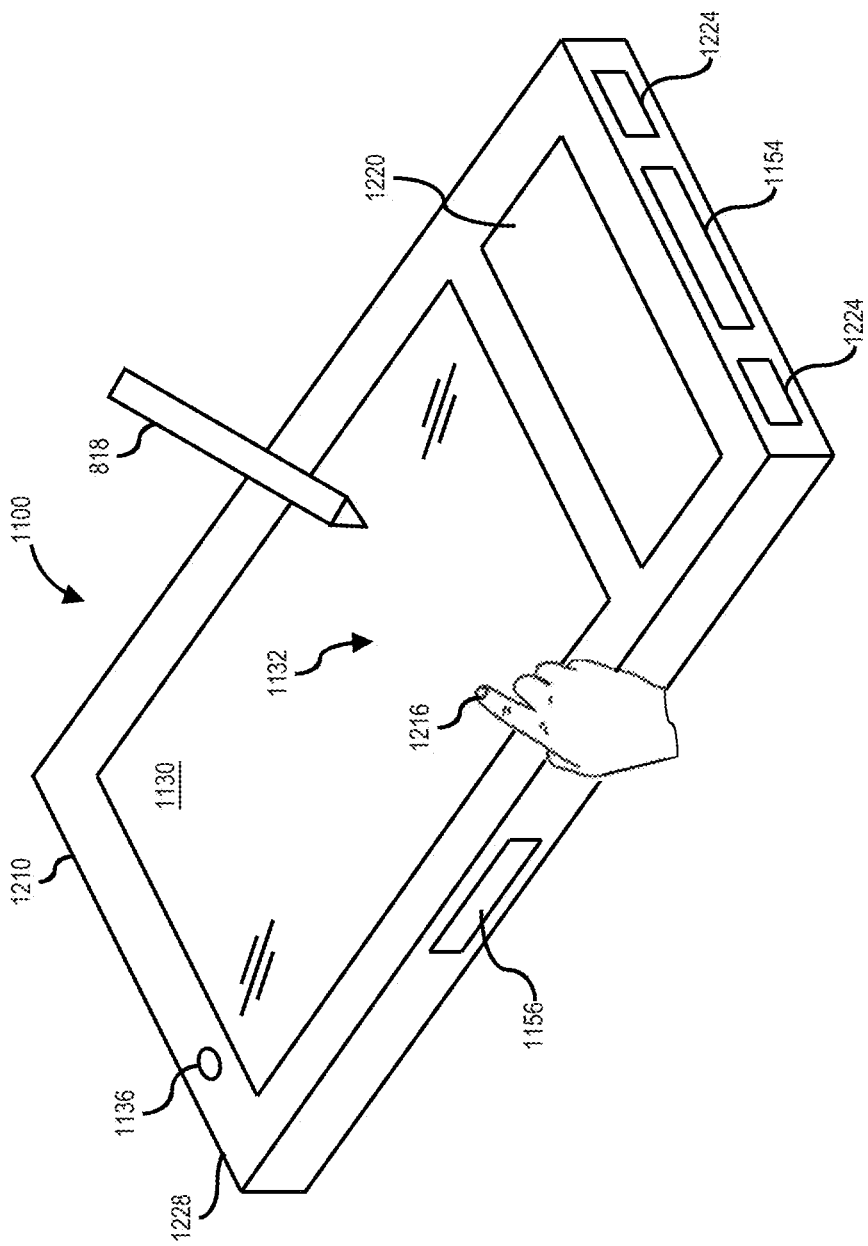
FIG. 12 is an isometric view of an information handling system of FIG. 11 that optionally may include a touch screen in accordance with one or more embodiments.

Referring now to FIG. 12, an isometric view of an information handling system of FIG. 11 that optionally may include a touch screen in accordance with one or more embodiments will be discussed. FIG. 12 shows an example implementation of information handling system 1100 of FIG. 11 tangibly embodied as a cellular telephone, smartphone, or tablet type device or the like. In one or more embodiments, the information handling system 1100 may comprise platform 100 of FIG. 1, although the scope of the claimed subject matter is not limited in this respect. The information handling system 1100 may comprise a housing 1210 having a display 1130 which may include a touch screen 1132 for receiving tactile input control and commands via a finger or fingers 1216 of a user and/or a via stylus 1218 to control one or more applications processors 1110. The housing 1210 may house one or more components of information handling system 1100, for example one or more applications processors 1110, one or more of SDRAM 1114, NAND flash 1116, NOR flash 1118, baseband processor 1112, and/or WWAN transceiver 1120. The information handling system 1100 further may optionally include a physical actuator area 1220 which may comprise a keyboard or buttons for controlling information handling system via one or more buttons or switches. The information handling system 1100 may also include a memory port or slot 1156 for receiving non-volatile memory such as flash memory, for example in the form of a secure digital (SD) card or a subscriber identity module (SIM) card.

Optionally, the information handling system 1100 may further include one or more speakers and/or microphones 1224 and a connection port 1154 for connecting the information handling system 1100 to another electronic device, dock, display, battery charger, and so on. In addition, information handling system 1100 may include a headphone or speaker jack 1228 and one or more cameras 1136 on one or more sides of the housing 1210. It should be noted that the information handling system 1100 of FIG. 12 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to baseband cancellation of platform radio interference and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A platform, comprising:
    a bus circuit to transmit a digital bus signal via a bus of the platform, wherein the digital bus signal propagates as radio-frequency (RF) noise in the platform;
    a receiver to receive a signal that includes an error in the received signal due to RF coupling of the digital bus signal between the bus and the receiver;
    a processor coupled to the bus circuit and configured to calculate a noise vector from the digital bus signal and to send the noise vector to the receiver via a lower speed link external to the processor and the receiver; and
    a digital signal processor in the receiver separate from the processor and configured to receive the noise vector from the processor to estimate an error vector based at least in part on the noise vector and to subtract the estimated error vector from in-phase and quadrature components of a baseband version of the received signal to cancel the digital bus signal from the received signal.

2. A platform as claimed in claim 1, wherein the bus signal is generated from the bus, a memory circuit, a clock, a power supply, a circuit ground or integrated circuit substrate, or an input/output circuit of the platform.

3. A platform as claimed in claim 1, wherein the received signal comprises an orthogonal frequency-division multiplexing (OFDM) signal, and the digital signal processor is further configured to calculate noise vectors only for one or more OFDM carrier frequencies.

4. A platform as claimed in claim 1, wherein the digital signal processor is further configured to scale the noise vector to arrive at the estimated error vector.

5. A platform as claimed in claim 4, wherein the digital signal processor is further configured to scale the noise vector to account for an additional coupling path between the bus circuit and the receiver, or one or more front end stages of the receiver, or combinations thereof.

6. A platform as claimed in claim 1, wherein the digital signal processor is further configured to synchronize calculated noise vectors with a symbol time of the receiver.

7. A platform as claimed in claim 1, wherein the digital signal processor is further configured to implement two or more noise vector scaling and synchronization blocks in a multi-tap configuration to arrive at an estimated noise vector for two or more noise signals from two or more sources or paths.

8. An information handling system, comprising:
 a processor;
 a radio transceiver coupled to the processor via a lower speed link; and
 a data circuit coupled to the processor to communicate with one or more peripheral devices, wherein the data circuit transmits a digital data signal in the system, wherein the digital data signal propagates as radio-frequency (RF) noise;
 wherein the processor is configured to calculate a noise vector based at least in part on a noise signal generated from the data circuit that results in an error vector in a received signal at the radio transceiver due to RF coupling of the digital data signal between the radio transceiver and the data circuit; and
 wherein the radio transceiver includes a digital signal processor separate from the processor that is configured to find an estimated error vector from the noise vector and subtract the estimated error vector from the received signal to cancel the error vector from the received signal.

9. An information handling system as claimed in claim 8, wherein the radio transceiver includes an adaptive filter to scale the noise vector and find the estimated error vector.

10. An information handling system as claimed in claim 8, wherein the radio transceiver is further configured to subtract the estimated error vector from an in-phase and quadrature components of a baseband version of the received signal.

11. An information handling system as claimed in claim 8, wherein the radio transceiver is further configured to synchronize the noise vector with a symbol time of the radio transceiver.

12. An information handling system as claimed in claim 8, wherein the data circuit comprises a bus, a memory circuit, a clock, a power supply, a circuit ground or integrated circuit substrate, or an input/output circuit.

13. An information handling system as claimed in claim 8, wherein the lower speed link comprises a peripheral comprises a peripheral component express (PCIe) interface, a universal serial bus (USB), a USB high speed inter-chip (HSIC) interface, or an M-PHY compliant interface.

14. An information handling system as claimed in claim 8, further comprising a touch screen to receive an input to control the processor.

15. A non-transitory computer readable memory device including instructions stored thereon that, when executed, result in:
 receiving a signal at a receiver that includes an error vector in the received signal due to a noise signal generated by a data circuit in a platform due to radio-frequency (RF) coupling of a digital signal from the data circuit, the received signal comprising an orthogonal frequency-division multiplexing (OFDM) signal;
 calculating a noise vector with a processor coupled to the digital data circuit based at least in part on the noise signal from the digital signal;
 sending the noise vector from the processor to the receiver via a lower speed link external to the processor and the receiver;
 estimating an error vector based at least in part on the noise vector; and
 subtracting the estimated error vector from the received signal to cancel the noise signal from the received signal.

16. A non-transitory memory device as claimed in claim 15, wherein the noise signal is generated from a bus, a memory circuit, a clock, a power supply, or an input/output circuit of the platform.

17. A non-transitory memory device as claimed in claim 15, wherein said subtracting comprises subtracting the estimated error vector from an in-phase and quadrature components of a baseband version of the received signal.

18. A non-transitory memory device as claimed in claim 15, wherein said calculating comprises calculating noise vectors only for one or more OFDM carrier frequencies.

19. A non-transitory memory device as claimed in claim 15, wherein the instructions, when executed, further result in scaling the noise vector to arrive at the estimated error vector.

20. A non-transitory memory device as claimed in claim 19, wherein the scaling accounts for an additional coupling path between the source of the noise signal and the receiver, or one or more front end stages of the receiver, or combinations thereof.

21. A non-transitory memory device as claimed in claim 15, wherein the instructions, when executed, further result in synchronizing the calculated noise vectors with a symbol time of the receiver.

* * * * *